US006714428B2

(12) United States Patent
Huang et al.

(10) Patent No.: US 6,714,428 B2
(45) Date of Patent: Mar. 30, 2004

(54) COMBINED TRANSFORMER-INDUCTOR DEVICE FOR APPLICATION TO DC-TO-DC CONVERTER WITH SYNCHRONOUS RECTIFIER (75) Inventors: Guisong Huang, Neihu Taipei (TW); Yilei Gu, Neihu Taipei (TW); Yuequan Hu, Neihu Taipei (TW); Alpha J. Zhang, Neihu Taipei (TW); Jack Hsiao, Taoyuan (TW)

(73) Assignee: Delta Electronics Inc., Taoyuan (TW)

( * ) Notice: Subject to any disclaimer, the term of this patent is extended or adjusted under 35 U.S.C. 154(b) by 0 days.

(21) Appl. No.: 10/107,733

(22) Filed: Mar. 26, 2002

(65) Prior Publication Data
US 2003/0185021 A1 Oct. 2, 2003

(51) Int. Cl.[7] .............................................. H02M 5/42
(52) U.S. Cl. .............................. 363/89; 363/47; 363/55
(58) Field of Search ........................ 363/21.06, 21.14, 363/56.05, 56.11, 89, 45, 47, 50, 55

(56) References Cited

U.S. PATENT DOCUMENTS 5,726,869 A * 3/1998 Yamashita et al. ....... 363/21.06
5,734,563 A * 3/1998 Shinada .................... 363/21.06
5,870,299 A * 2/1999 Rozman .................... 363/127
5,920,473 A * 7/1999 Sturgeon ................... 363/98
6,400,579 B2 * 6/2002 Cuk ............................ 363/16
6,466,458 B2 * 10/2002 Zhang et al. ................ 363/17
6,466,462 B2 * 10/2002 Nishiyama et al. ....... 363/21.11

* cited by examiner

Primary Examiner—Shawn Riley (57) ABSTRACT

An active clamped-mode DC-to-DC converter with synchronous rectifiers and a combined transformer-inductor device is provided. The power converter includes a combined transformer-inductor device having a primary winding, a secondary winding, and an auxiliary winding where the primary and the secondary windings perform a transformer function and the auxiliary winding performs an output filter function, a switching circuit for periodically providing a positive voltage to the primary winding and a negative voltage to reset the primary winding, and a synchronous rectification circuit connected for enabling conduction from the secondary winding to an output port in which the auxiliary winding is coupled between the output port and the synchronous rectification circuit for providing an inductance to filter an output signal.

8 Claims, 12 Drawing Sheets

COMBINED TRANSFORMER-INDUCTOR DEVICE FOR APPLICATION TO DC-TO-DC CONVERTER WITH SYNCHRONOUS RECTIFIER

FIELD OF THE INVENTION

The present invention relates to a DC-to-DC converter and more particularly to a DC-to-DC converter with synchronous rectifiers utilizing a combined transformer-inductor device.

BACKGROUND OF THE INVENTION

In semiconductor industry, the manufacturing process migrates to finer pitch with time for higher degree of integration and hence to better electrical performance. At lower pitch (i.e. equal to or less than 0.25 micrometer), the operating voltage of an IC (integrated circuit) decreases from 2.5V, 1.8V, and 1.5V to sub one volt. When more and more transistors are integrated into an IC, higher operating current is required. When a switching power converter delivers energy to drive ICs, the high conduction in rectifiers and long trace length often lead to low power conversion efficiency. The physical performance limitation factor of a power converter is the power density defined in Watts per cubic inch or Amperes per cubic inch. This invention improves the efficiency of power converters and reduces the size at a certain power density.

An approach to improve the efficiency of power converter for low voltage and high current output is to employ synchronous rectification. Synchronous rectification refers to using active devices such as MOSFET as a replacement for Schottky diodes for rectification in circuit. Since the drop voltage of the synchronous rectifier is much less than the drop voltage of diodes, the conduction loss of rectifier can be reduced greatly.

Another approach to reduce the conduction loss and improve the power density of the converter is disclosed by U.S. Pat. No. 4,803,609, issued to John B. Gillett, for "D.C. to D.C. Converter", which combines transformer device and output filter inductor to reduce the size of the energy storage components and minimize the conduction loss of secondary winding and connection trace.

Another approach to improve the efficiency of power converters is to maximize the energy of the switching devices and the transformer during each switching cycle in order to improve the power transfer characteristic of the converter as indicated in U.S. Pat. No. 4,441,146 issued to P. Vinciarelli for "Optimal resetting of the transformer's core in single ended forward converters". This approach is to use a clamped mode topology to reduce the power loss of the primary switch and recycle the leakage energy of the transformer. And in U.S. Pat. No. 5,303,138 issued to Allen F. Rozman for "Low loss synchronous rectifier for application to clamped-mode power converters" the combination of this clamped mode topology and synchronous rectifier is disclosed, thereby achieving higher conversion efficiency.

However, each of the above disclosures indicates some facts of the power conversion issue, none provides an approach achieving all of the advantages discussed above. Furthermore, with the increase of switching frequency, the core loss of transformer is also a significant factor in power loss dissipation. For the purpose of high efficiency and high power density, the primary switch loss, synchronous rectifier loss, transformer winding loss and transformer core loss all should be minimized.

For the above reasons, a need still exists in the art of designing and manufacturing DC/DC converter to provide an optimal configuration for low voltage and high current output. The improved converter configuration will be described in this invention as below.

SUMMARY OF THE INVENTION

It is therefore an object of the present invention to propose a high power density and high efficiency DC-to-DC converter for generating a low voltage output and a high current output by utilizing a combined transformer-inductor device and a synchronous rectification circuit.

It is therefore another object of the present invention to propose a clamped-mode DC-to-DC converter for generating a low voltage output and a high current output by utilizing a combined transformer-inductor device and a synchronous rectification circuit in order to minimize the primary switch loss, synchronous rectifier loss, transformer winding loss and transformer core loss.

According to an aspect of the present invention, the power converter includes an input port for accepting a DC voltage; an output port for accepting a load to be energized, a combined transformer-inductor device having a primary winding, a secondary winding, and an auxiliary winding in which the primary and secondary windings perform a transformer function and the auxiliary winding performs an output filter function; a switching circuit connected to the input port for periodically providing a positive voltage to the primary winding during a first interval of a cyclic period of the power converter and a negative voltage to reset the primary winding during a second interval other than the first interval; and a synchronous rectification circuit connected for enabling conduction from the secondary winding to the output port during the first interval and the second interval of the cyclic period, wherein the auxiliary winding is coupled between the output port and the synchronous rectification circuit for providing an inductance to filter an output signal.

Preferably, the combined transformer-inductor device further includes a magnetic core with a high reluctance flux path and a low reluctance flux path sharing a common segment. The energy from the primary winding is partly transferred to the secondary winding via the low reluctance flux path and partly stored in the high reluctance flux path during the first interval of the cyclic period.

Preferably, energy stored in the high reluctance flux path is transferred from the combined transformer-inductor device to the synchronous rectification circuit via the auxiliary winding during the second interval of the cyclic period.

Preferably, an air gap is positioned in the common segment to reduce an output current ripple.

Preferably, the switching circuit further includes a clamp device for limiting a voltage across the transformer during the second interval of the cyclic period.

Preferably, the synchronous rectification circuit includes a first synchronous rectification device connected for enabling conduction from the secondary winding to the output port during the first interval of the cyclic period, and a second synchronous rectification device connected for enabling conduction from the secondary winding to the output port during the second interval of the cyclic period.

Preferably, the synchronous rectification circuit includes a first synchronous rectification device with a control gate responsive to a voltage of the secondary winding and biased periodically conducting and connected for conducting current from the secondary winding to the output port, and a second synchronous rectification device connected for conducting from the secondary winding to the output port when the first synchronous rectification device is non-conducting.

Preferably, the first synchronous rectification device is a synchronous rectifier.

Preferably, the second synchronous rectification device is a synchronous rectifier.

Preferably, the synchronous rectifier is a MOSFET.

It is therefore another aspect of the present invention to propose a power converter including an input port for accepting a DC voltage; an output port for accepting a load to be energized; a combined transformer-inductor device having a primary winding, a secondary winding, and an auxiliary winding in which the primary and the secondary windings perform a transformer function and the auxiliary winding performs an output filter function; a switching circuit connected to the input port for periodically providing a positive voltage to the primary winding during a first interval of a cyclic period of the power converter and a negative voltage to reset the primary winding during a second interval other than the first interval, wherein the switching circuit further includes a clamp device for limiting a voltage across the transformer during the second interval of the cyclic period; and a synchronous rectification circuit connected for enabling conduction from the secondary winding to the output port during the first interval and the second interval of the cyclic period, wherein the auxiliary winding is coupled between the output port and the synchronous rectification circuit for providing an inductance to filter an output signal.

The present invention may best be understood through the following description with reference to the accompanying drawings, in which:

DETAILED DESCRIPTION OF THE PREFERRED EMBODIMENT

Figure 1:
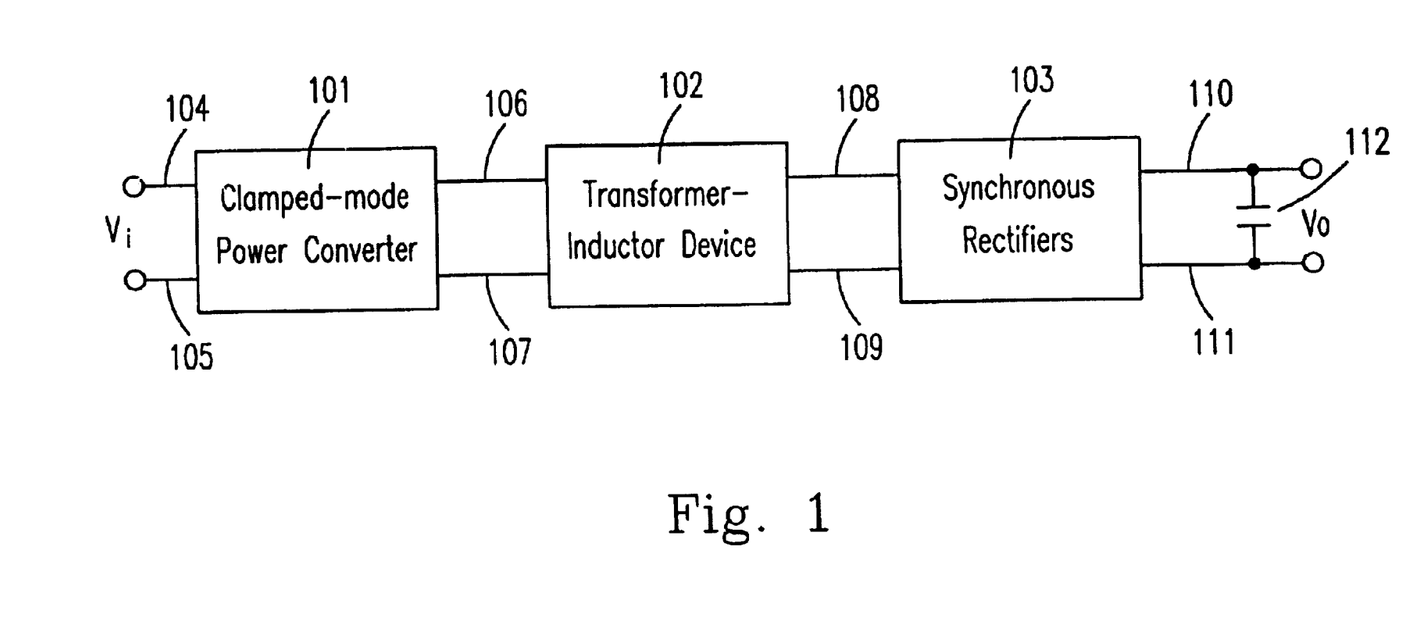
FIG. 1 is a block diagram of a DC-to-DC converter with synchronous rectifiers utilizing a transformer-inductor device according to a preferred embodiment of the present invention.

FIG. 1 is a block diagram of a DC-to-DC converter with synchronous rectifiers utilizing a transformer-inductor device according to a preferred embodiment of the present invention. As shown in FIG. 1, a DC voltage $V_i$, which may be, by way of example, 220 volts, is applied through conductors 104 and 105 to a clamped-mode power converter 101 shown and described in detail hereinafter. The DC voltage $V_i$ is converted to a pulse wave train, which is then applied through conductors 106 and 107 to a transformer-inductor device 102 more fully described hereinafter. The output signals from the transformer-inductor device 102, which are low voltage output and high current output, are applied through conductors 108 and 109 to synchronous rectifiers 103 described in greater detail hereinafter. The resultant signals of the synchronous rectifiers 103 are applied through conductors 110 and 111 and filtering by the filtering capacitor 112 to provide a ripple free DC output voltage $V_O$. The transformer-inductor device 102 also includes inductance used to filter the signals on the transformer secondary.

Figure 9:
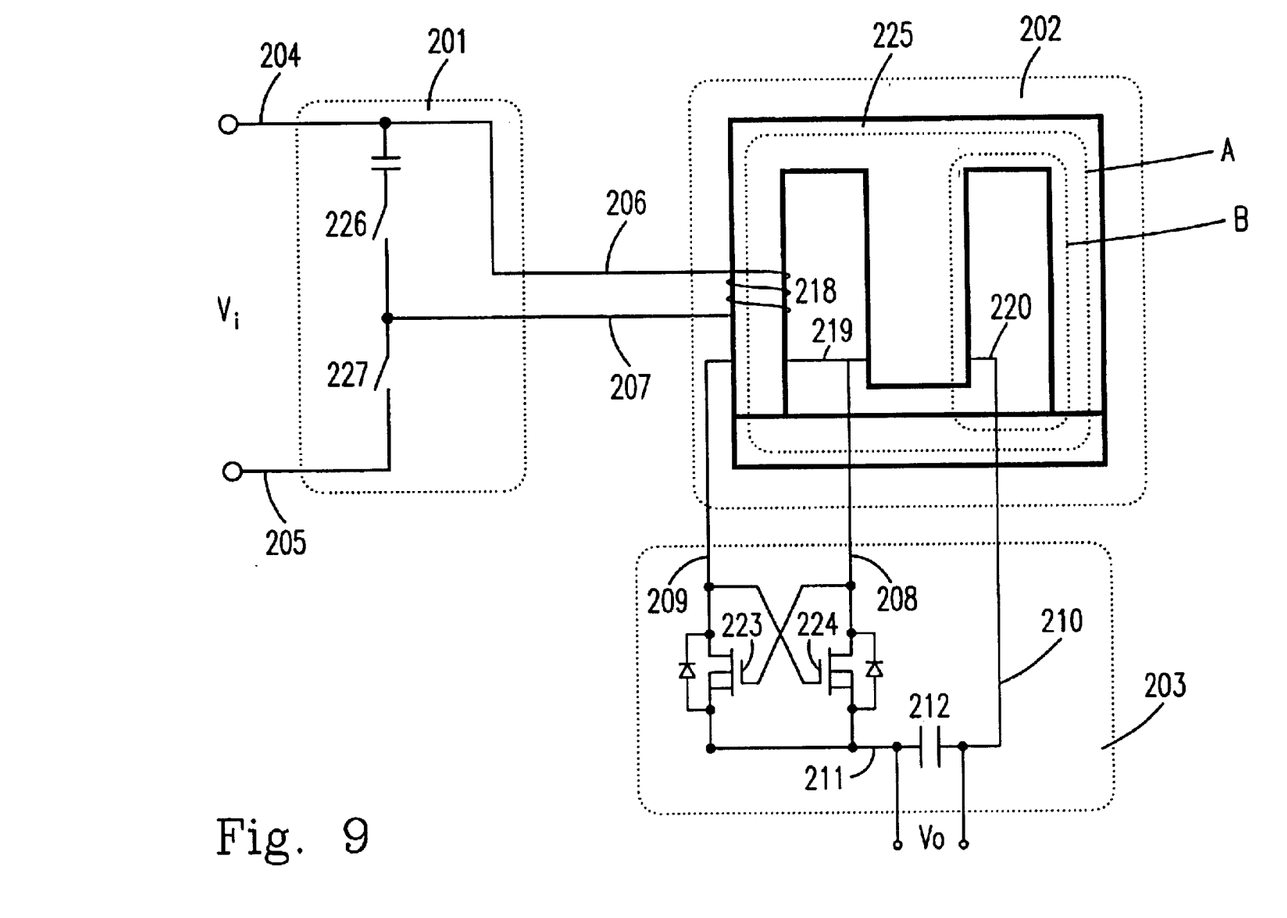
FIG. 9 is a schematic diagram of a DC-to-DC converter with synchronous rectifiers utilizing a transformer-inductor device according to a fifth preferred embodiment of the present invention.
Figure 10:
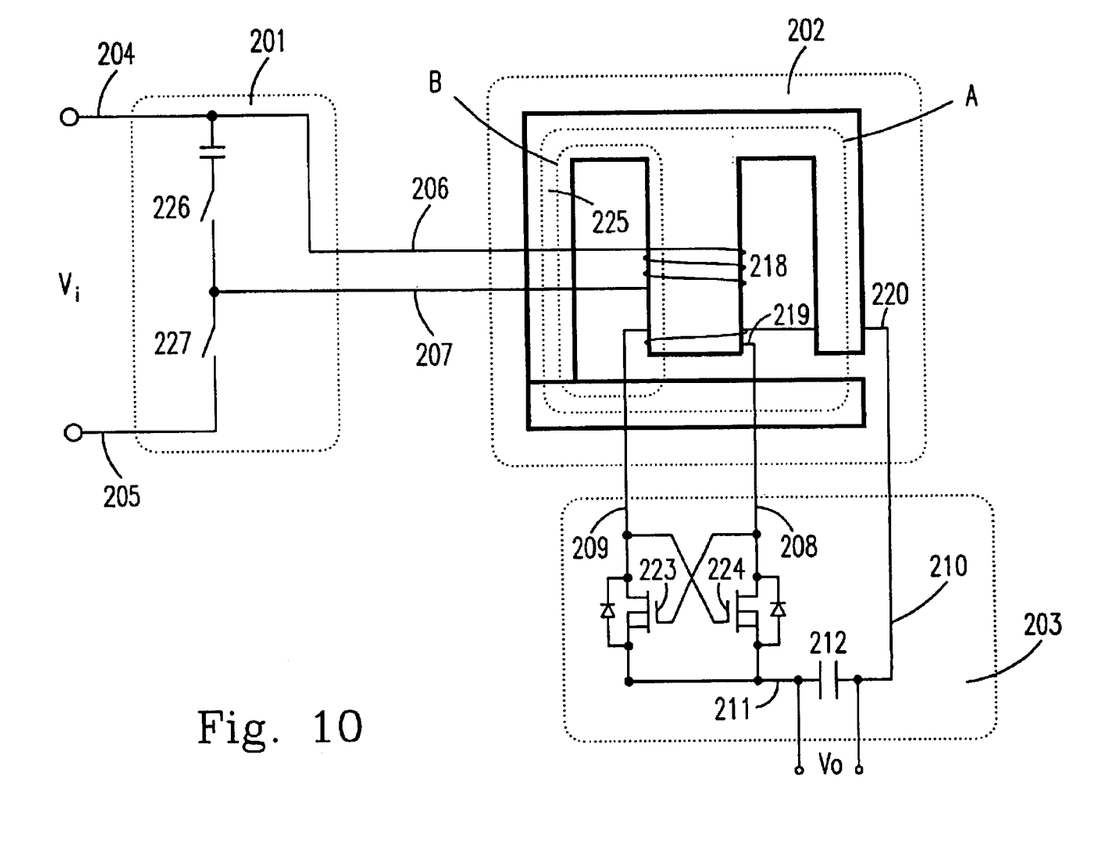
FIG. 10 is a schematic diagram of a DC-to-DC converter with synchronous rectifiers utilizing a transformer-inductor device according to a sixth preferred embodiment of the present invention.

The present invention is operated in a switch mode power supply (SMPS) mode. The power converter may be a single switch active clamp circuit, as shown in FIGS. 9 and 10, or a dual switch active clamp circuit, as shown in FIGS. 2–3, 5, 7 and 11. It will be understood by those skilled in the art that other symmetric or asymmetric switching circuits may be employed.

Figure 2:
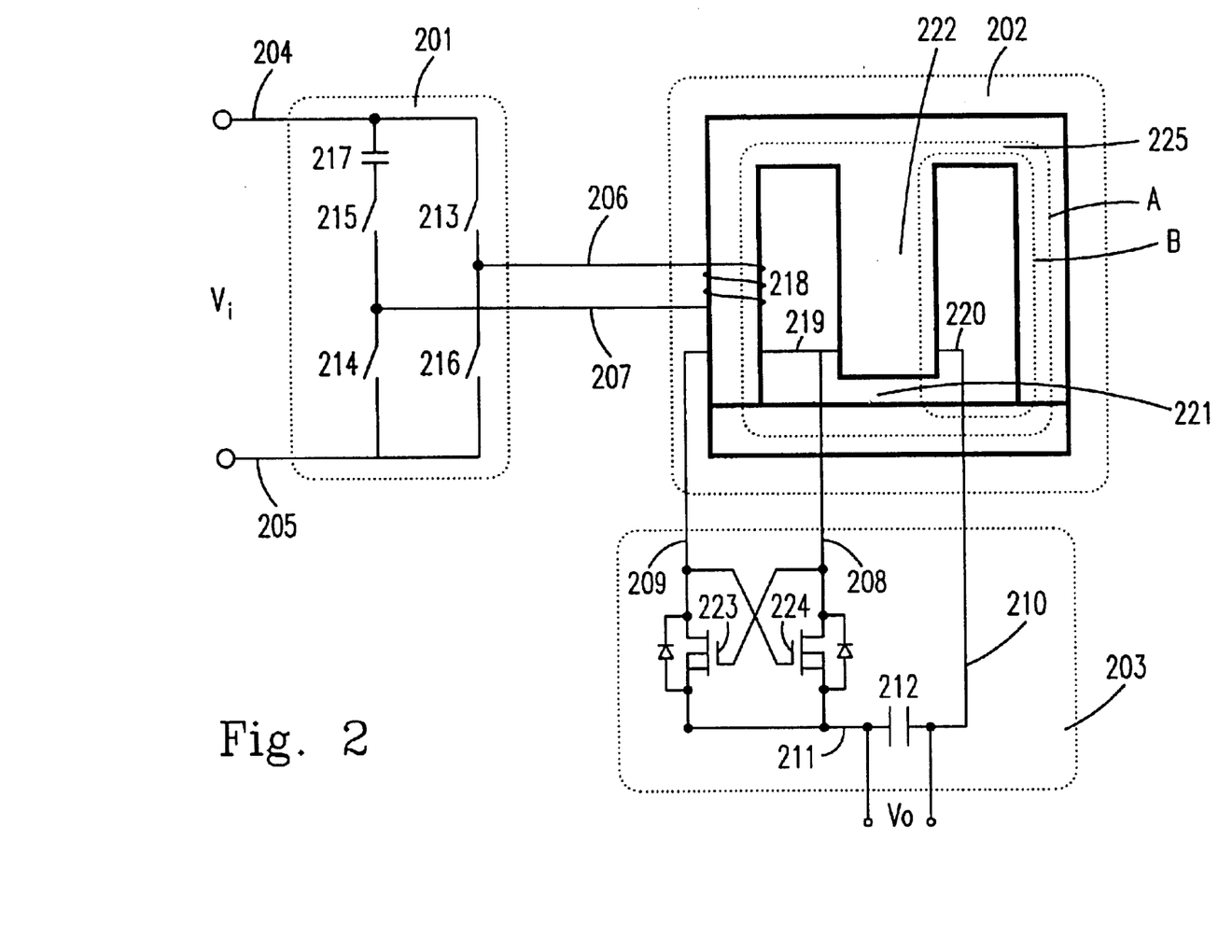
FIG. 2 is a schematic diagram of a DC-to-DC converter with synchronous rectifiers utilizing a transformer-inductor device according to a first preferred embodiment of the present invention.

Please refer to FIG. 2. The DC voltage $V_1$ is applied via conductors 204 and 205 across a full bridge switching circuit 201 in which the switches 213 and 214 are coupled to operate simultaneously to provide a positive voltage to the primary winding 218 of the combined transformer-inductor device 202 via conductors 206 and 207 during a first interval of a cyclic period of the power converter. During a second interval other than the first interval, the switches 215 and 216 of the full bridge switching circuit 201 are coupled to operate simultaneously to provide a negative voltage to reset the primary winding 218 of the combined transformer-inductor device 202. The conduction of the switches 213, 214 and the switches 215, 216 are mutually exclusive. The full bridge switching circuit 201 further includes a clamp capacitor 217 in series connection with the switch 215 for limiting the amplitude of the reset voltage appearing across the magnetizing inductance of the combined transformer-inductor device 202 during the non-conducting interval of the switches 213 and 214.

However, the combined transformer-inductor device 202 has a primary winding 218, a secondary winding 219, and an auxiliary winding 220 in which the primary and secondary windings 218 and 219 perform a transformer function and the auxiliary winding 220 performs an output filter function. The combined transformer-inductor device 202 further includes a magnetic core with a low reluctance flux path A and a high reluctance flux path B sharing a common segment 225 in which energy is transferred from the primary winding 218 to the secondary winding 219 via the low reluctance flux path A and partly stored in the high reluctance flux path B during the first interval of the cyclic period. The energy stored in the high reluctance flux path B is transferred from the combined transformer-inductor device 202 to the synchronous rectification circuit 203 via the auxiliary winding 220 during the second interval of the cyclic period. Thus the auxiliary winding 220 provides some or all of the inductance required in the output filter.

Additionally, in the combined transformer-inductor device 202, a small air gap 221 is formed between the center leg 222 and the lower member. The position of this air gap 221 may be altered as desired, as will be more fully described hereinafter. The primary and secondary windings 218 and 219 are wound around the outside leg of the core. In the operation of the above mentioned combined transformer-inductor device 202, oscillating magnetic fluxes developed by energization of the primary winding 218 are subject to a high reluctance at the air gap 221 if they should pass therethrough, so that they establish the high reluctance flux path B and the low reluctance flux path A. Thus the high reluctance flux path B functions as an output inductor and the low reluctance flux path A functions as a transformer.

The resultant signals of the secondary winding 220 are applied through conductors 208 and 209 to the synchronous rectification circuit 203, which includes a first synchronous rectifier 223 and a second synchronous rectifier 224. The first synchronous rectifier 223 is connected for enabling conduction from the secondary winding 219 during the first interval of the cyclic period. And, the second synchronous rectifier 224 is connected for enabling conduction from the secondary winding 219 during the second interval of the cyclic period. Thus the voltage of the secondary winding 219 is used to drive the synchronous rectification circuit 203 so that the driving loss of the synchronous rectification circuit 203 can be recycled and the dead time of driving signals of the synchronous rectification circuit 203 can be minimized. The output signals from the synchronous rectification circuit 203 are applied through conductors 210 and 211 to the filtering capacitor 212 and then filtering by the filtering capacitor 212 to provide a ripple free DC output voltage $V_0$.

Figure 3:
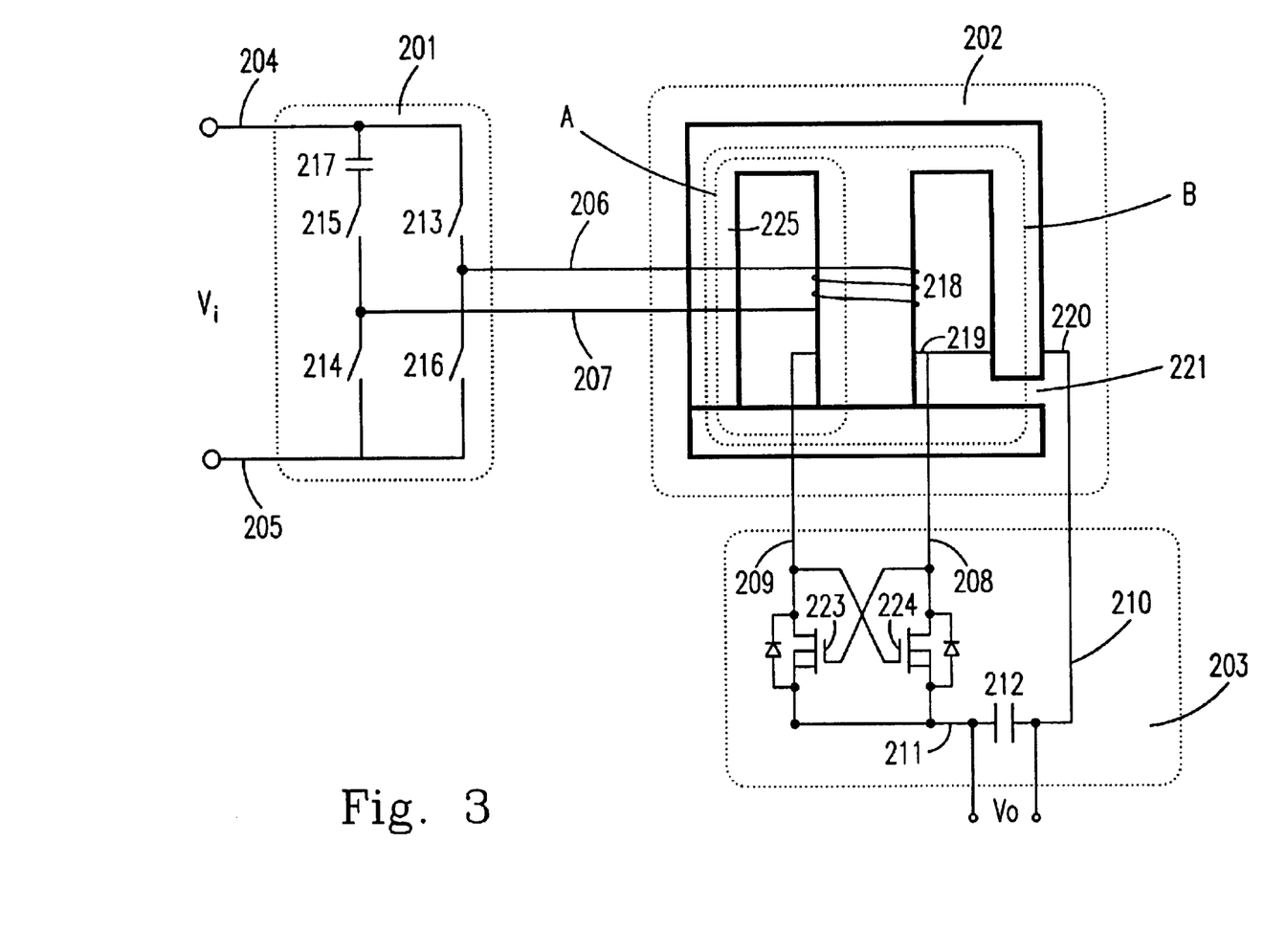
FIG. 3 is a schematic diagram of a DC-to-DC converter with synchronous rectifiers utilizing a transformer-inductor device according to a second preferred embodiment of the present invention.
Figure 4:
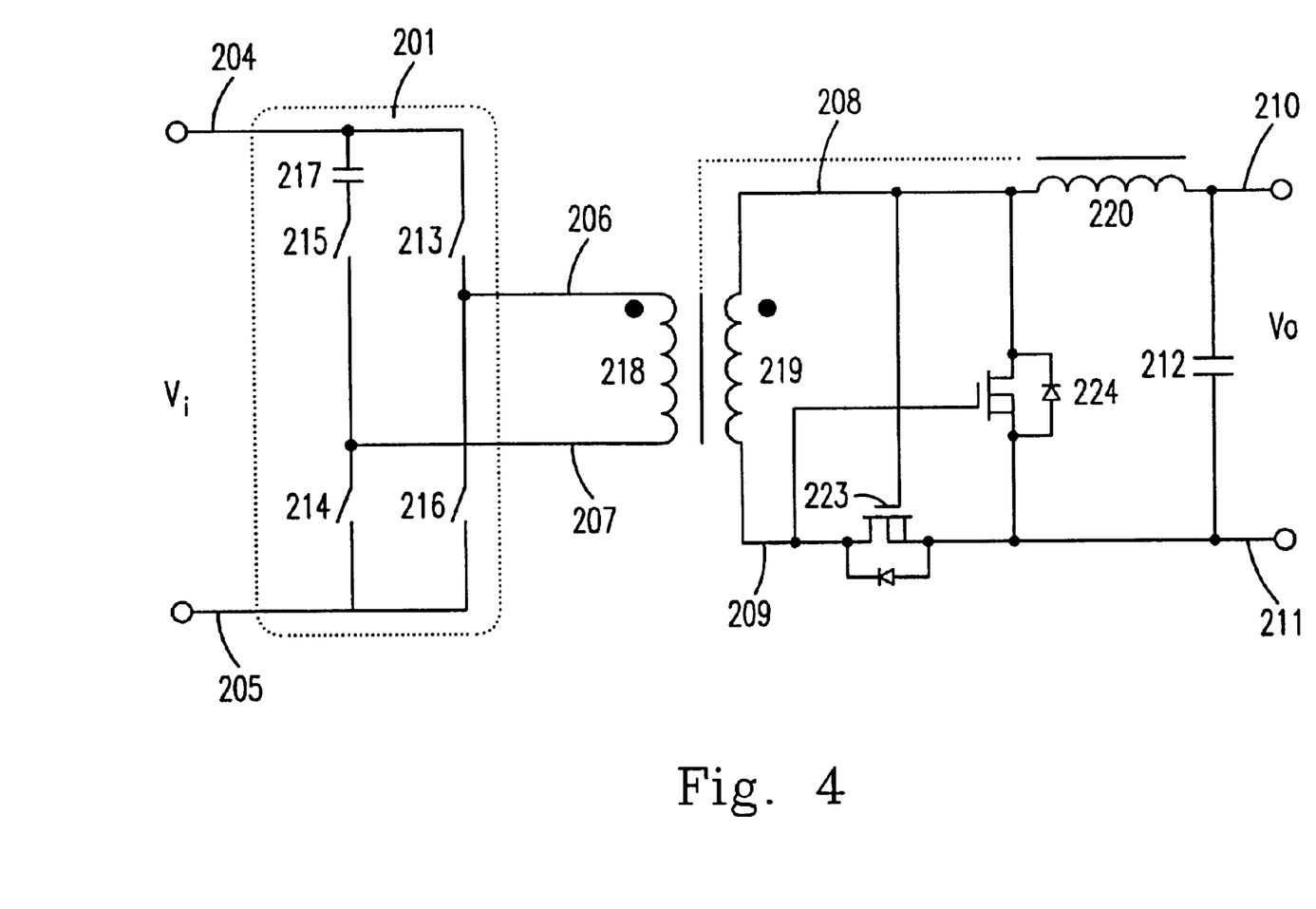
FIG. 4 illustrates the equivalent circuit of FIG. 2 and FIG. 3.

Please refer to FIG. 3. FIG. 3 shows a modified embodiment of the invention. The air gap is formed between the outside leg of the core and the lower member to establish the high reluctance flux path B. The primary and secondary windings are wound around the central leg of the core. FIG. 4 shows the equivalent circuit of FIG. 2 and FIG. 3. It is a dual switch active clamped-mode forward converter with synchronous rectifiers and the combined transformer-inductor device.

Figure 5:
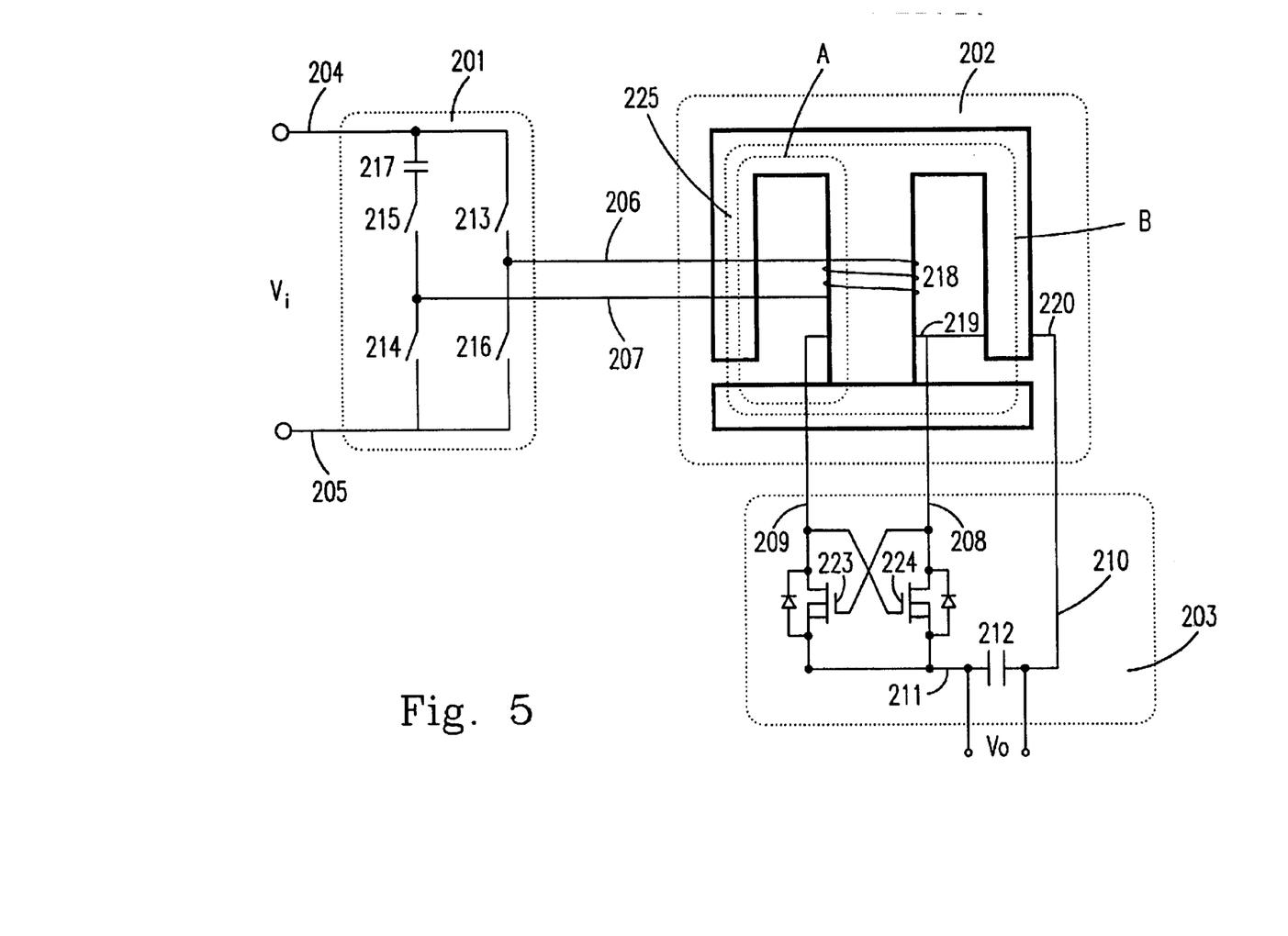
FIG. 5 is a schematic diagram of a DC-to-DC converter with synchronous rectifiers utilizing a transformer-inductor device according to a third preferred embodiment of the present invention.

Please refer to FIG. 5. FIG. 5 shows another embodiment of this invention. The primary and secondary windings 218 and 219 are wound around the center leg of the core and then form a transformer. An air gap in one of outside leg of the core establishes the high reluctance flux path B and performs the inductor function. Another gap is positioned in the other outside leg, so that the transformer and the inductor can be coupled each other. The output current ripple can be canceled by adjusting the gaps of the outside legs. But the trade-off is that the magnetizing current in the primary winding will increase and cause more conduction loss.

Figure 6:
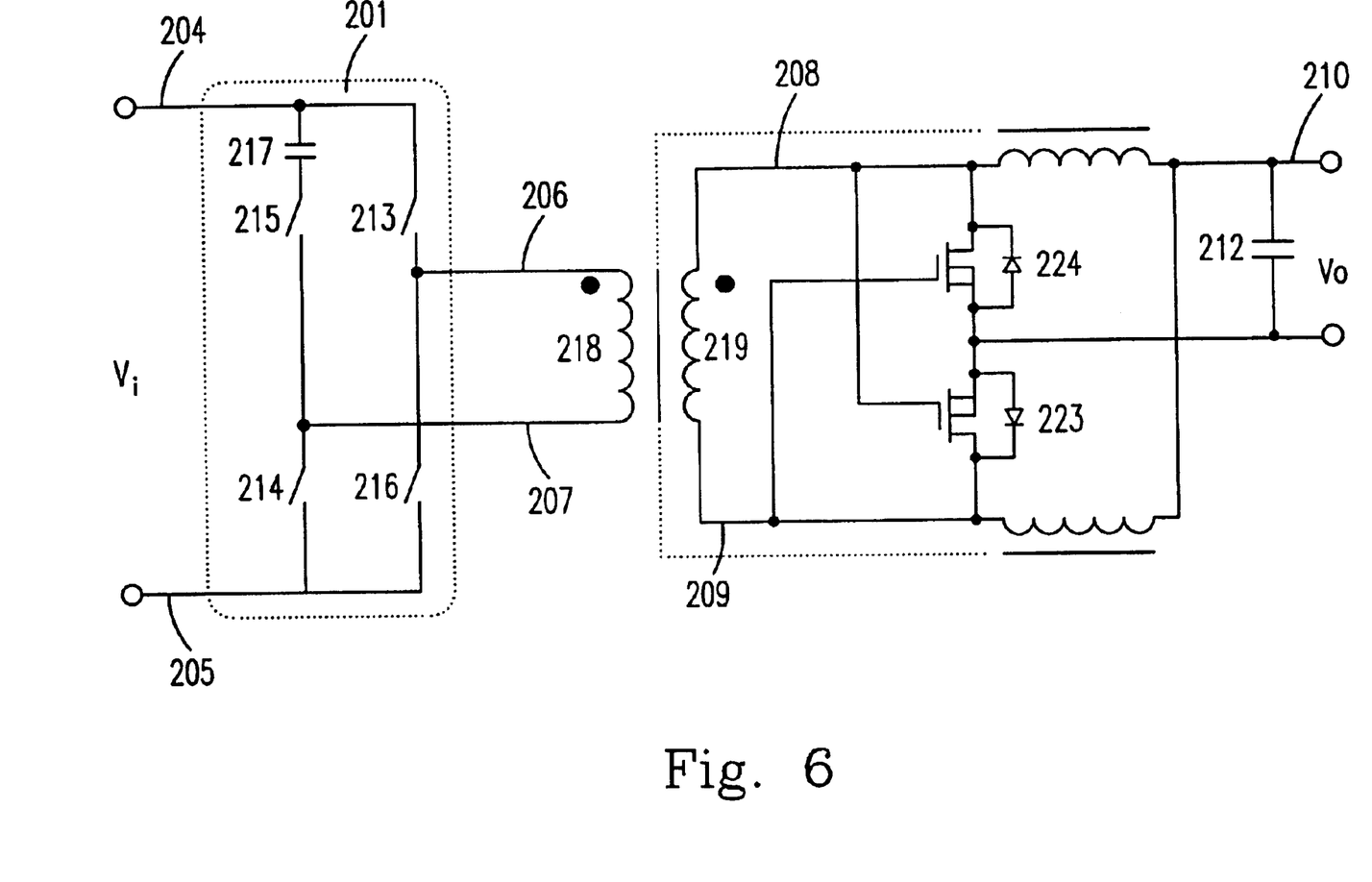
FIG. 6 illustrates the equivalent circuit of FIG. 5.

FIG. 6 shows the equivalent of FIG. 5. The output circuit of the power converter is a current doublers type rectifier.

Figure 7:
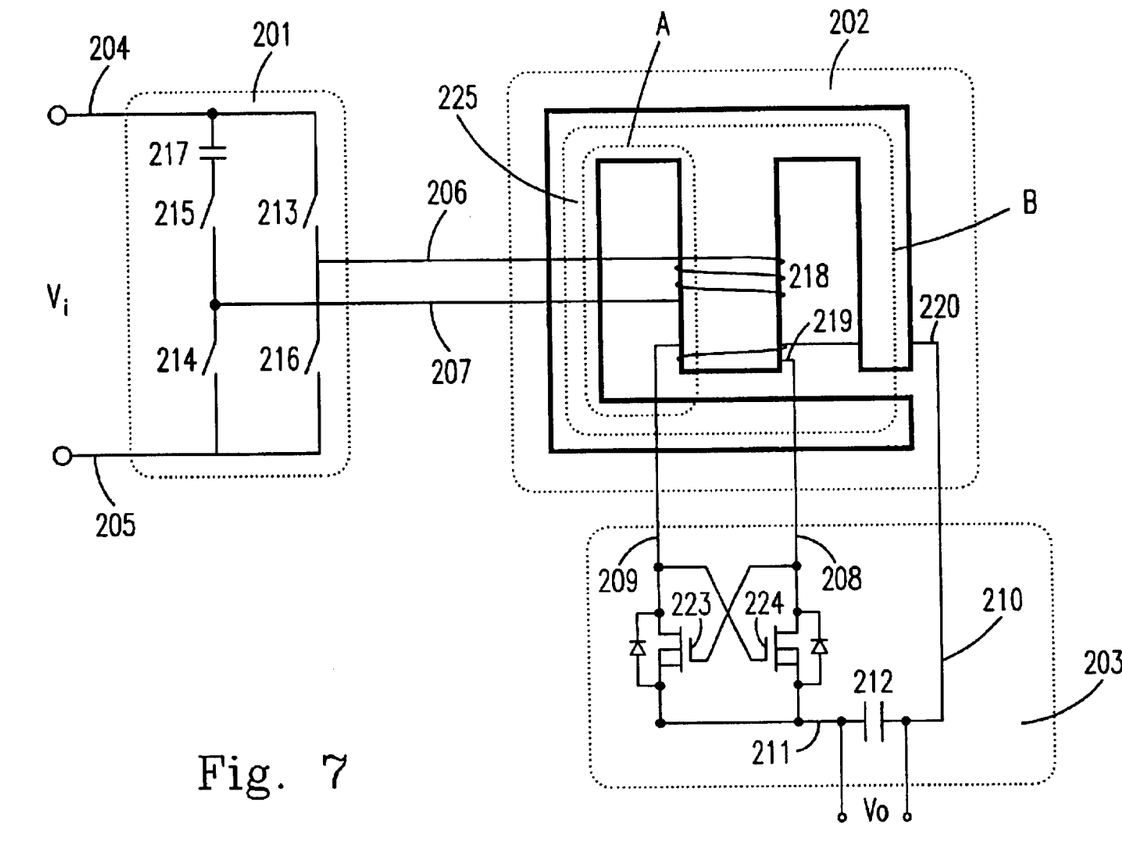
FIG. 7 is a schematic diagram of a DC-to-DC converter with synchronous rectifiers utilizing a transformer-inductor device according to a fourth preferred embodiment of the present invention.
Figure 8:
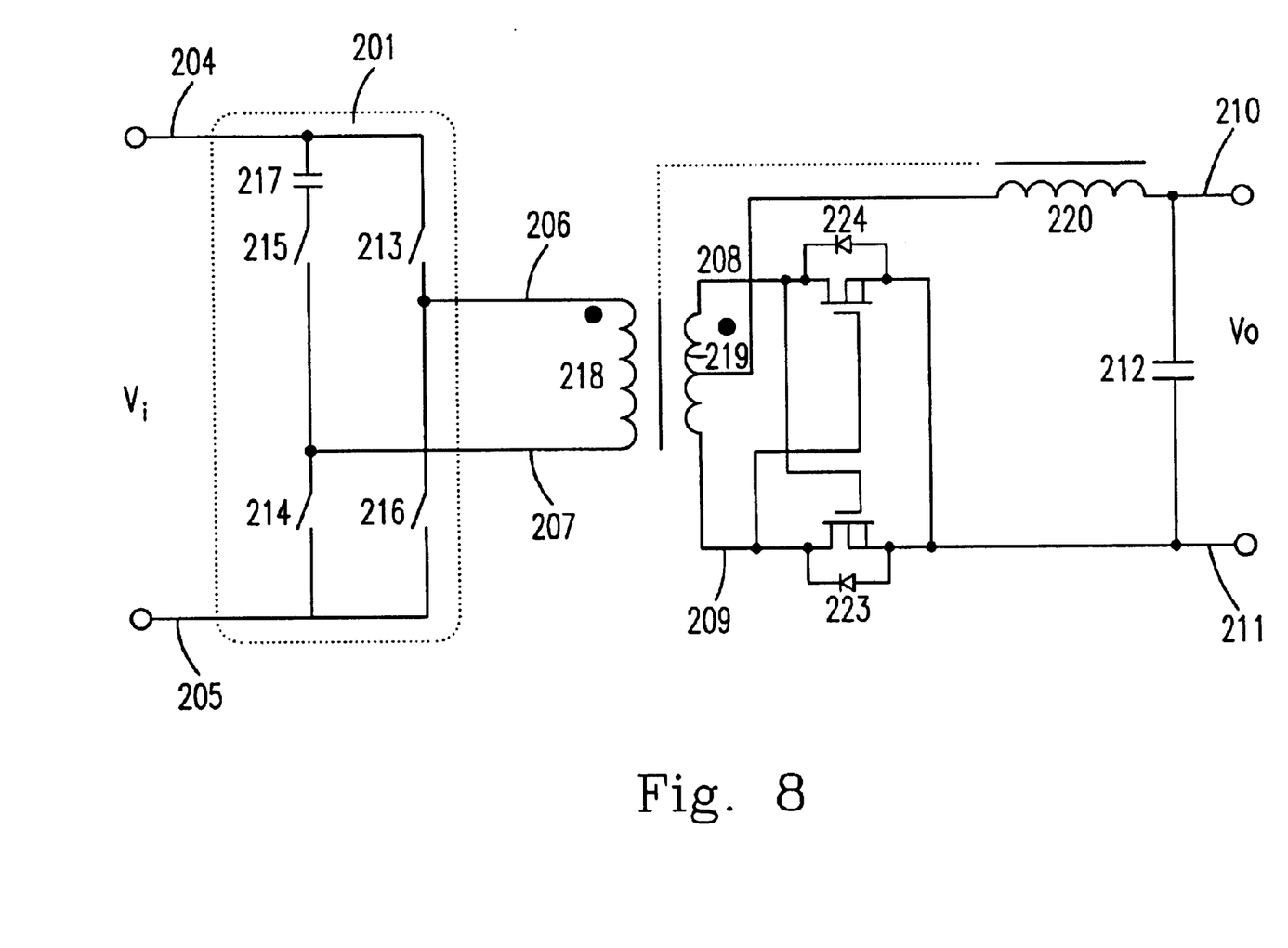
FIG. 8 illustrates the equivalent circuit of FIG. 7.

For some requirement, the secondary winding of the transformer may have more than one turn. In this case an output inductor can be generated from the center tap of the secondary winding. As shown in FIG. 7, the secondary winding has two turns in which one can be functioned as the output inductor. The equivalent circuit of FIG. 7 can be illustrated as FIG. 8. Since the magnetizing inductance of the transformer functions as an output filter, an air gap is necessary provided in the low reluctance flux path A to prevent the magnetic core from saturating.

FIGS. 9 and 10 show the other two embodiment of this invention. A single switch active clamp circuit is employed, which provides the same function as the dual switch active clamp circuit. During the first interval of the cyclic period, the switch 227 is turned on and the switch 226 is turned off so that energy is transferred to the combined transformer-inductor device. During the second interval of the cyclic period other than the first interval, the switch 226 is turned on and the switch 227 is turned off to reset the transformer. Hence square wave signals with adjustable duty cycle are generated to the primary winding of the transformer via the switches. FIG. 9 shows the configuration in which the air gap is positioned at center leg. FIG. 10 shows the configuration of center-tapped winding structure in which there are air gaps positioned at the center leg and the outside leg.

Figure 11:
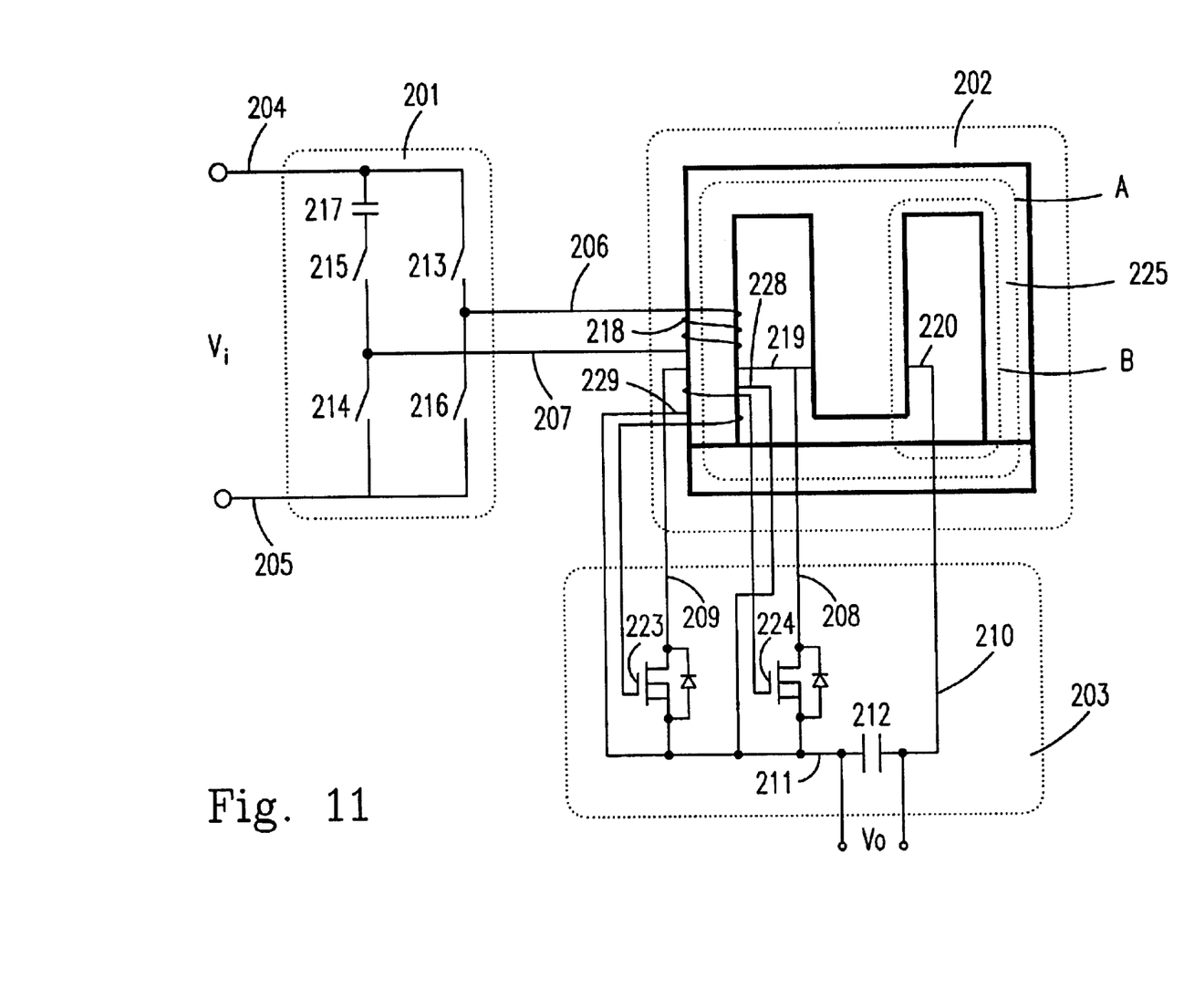
FIG. 11 is a schematic diagram of a DC-to-DC converter with synchronous rectifiers utilizing a transformer-inductor device according to a seventh preferred embodiment of the present invention.
Figure 12:
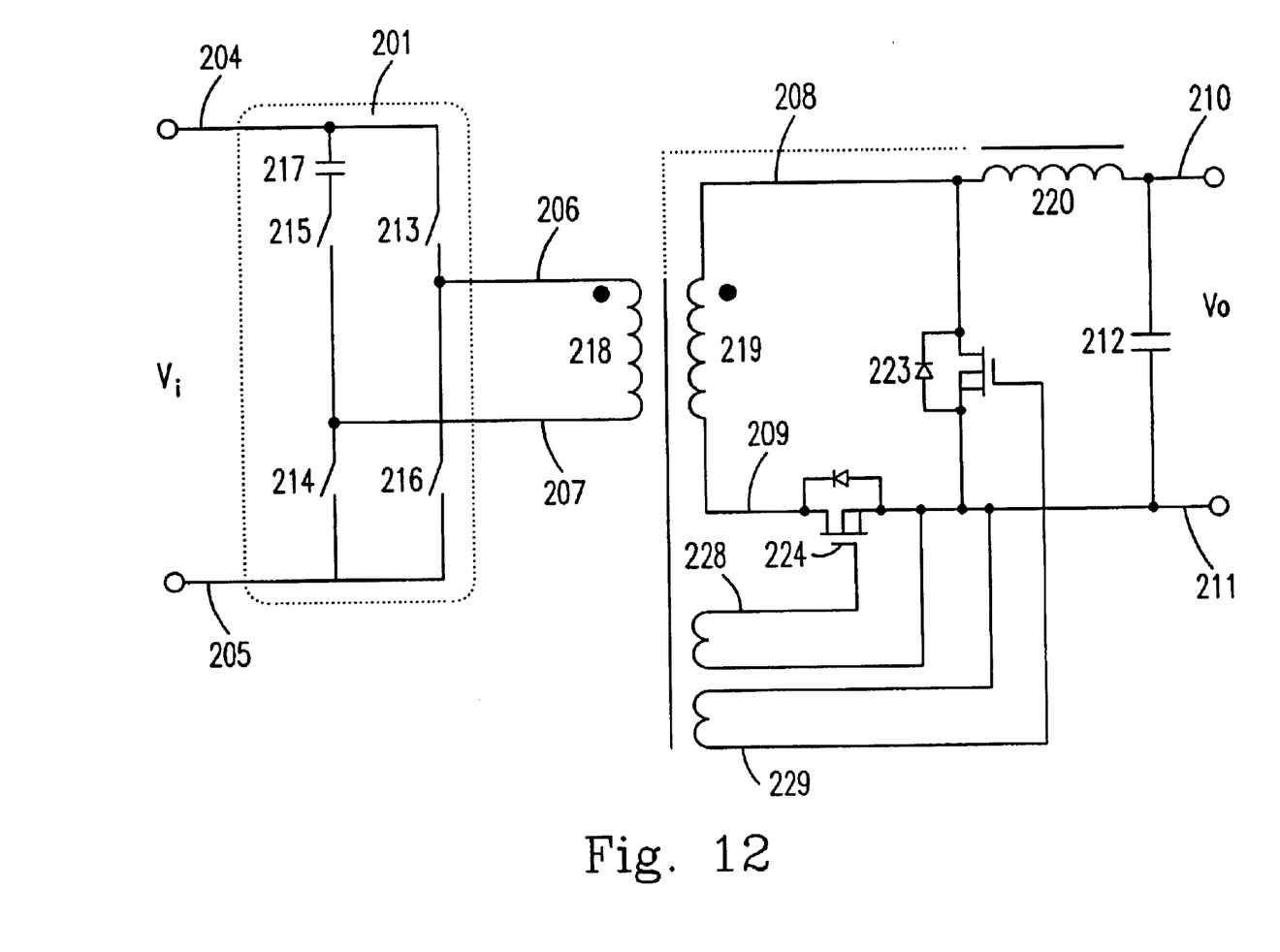
FIG. 12 illustrates the equivalent circuit of FIG. 11.

Please refer to FIG. 11. FIG. 11 shows another auxiliary windings 228 and 229 are wound around the low reluctance flux path and used for providing full square wave signals to drive synchronous rectifiers. FIG. 12 shows the equivalent circuit of FIG. 11.

Owing to the above descriptions, the present invention provides an active clamp-mode DC-to-DC converter with synchronous rectifiers and a combined transformer-inductor device. There are many advantages as described in the following:

The clamp switching circuit provides full square wave signals to the combined transformer-inductor device so that the AC flux in the low reluctance flux path and the high reluctance flux path increases or decreases linearly. Because the high reluctance flux path and the low reluctance flux path share a common segment, the AC flux in the common segment will be cancelled. Therefore, the magnetic core loss will be reduced.

The primary, secondary and auxiliary windings can be physically positioned as close as possible to reduce the stray parameters due to the connection trace. On the other hand, to reduce the current ripple generally requires inductors and capacitors. The combined transformer-inductor device provides both the transformer function and the output filter function that the transformer is tightly coupled with the inductor. The common path of the secondary winding and the auxiliary winding (inductor winding) is omitted. Hence the winding loss is reduced.

Since the transformer and output inductor are integrated into a single magnetic unit, the invention provides a simple and compact converter. The efficiency and power density can be improved by the invention.

On the other hand, the primary switch loss, synchronous rectifier loss, transformer winding loss and transformer core loss all should be minimized owing to the integration of an active clamp-mode DC-to-DC converter with synchronous rectifiers and a combined transformer-inductor device.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A power converter, comprising:

an input port for accepting a DC voltage;

an output port for accepting a load to be energized;

a combined transformer-inductor device including:

a magnetic core including an upper member, a lower member, and a plurality of legs extending between the upper and lower member such that at least one of the plurality of legs contacts both the upper member and the lower member, a primary winding and a secondary winding wound around a first leg of the plurality of legs such that a high reluctance flux path is formed in the first leg, the upper member, a second leg of the plurality of legs and the lower member, and an auxiliary winding wound around a third leg of the plurality of legs and connected in series between the secondary winding and the output port such that a low reluctance flux path is formed in the second leg, the upper member, the third leg and the lower member, wherein said primary and said secondary windings perform a transformer function and said auxiliary winding performs an output filter function;

a clamp switching circuit connected to said input port for periodically providing a first full square waveform signal with a positive voltage to said primary winding during a first interval of a cyclic period of said power converter and a second full square waveform signal with a negative voltage to reset said primary winding during a second interval other than said first interval, whereby AC flux is cancelled in said second leg to reduce a magnetic loss of said combined transformer-inductor device; and a synchronous rectification circuit connected to the combined transformer-inductor device for enabling conduction from said secondary winding to said output port during said first interval and said second interval of said cyclic period, wherein said auxiliary winding is coupled between said output port and said synchronous rectification circuit for providing an inductance to filter an output signal.

2. The power converter according to claim 1, wherein a first end of said second leg is connected to the upper member, and an air gap is defined between a second end of the second leg and the lower member to reduce an output current ripple.

3. The power converter according to claim 1, wherein said clamp switching circuit comprises one of a single switch active clamp circuit and a dual switch active clamp circuit and further comprises a clamp device for limiting a voltage across said transformer during said second interval of said cyclic period.

4. The power converter according to claim 1, wherein said synchronous rectification circuit comprises:

a first synchronous rectification device connected for enabling conduction from said secondary winding to said output port during said first interval of said cyclic period; and a second synchronous rectification device connected for enabling conduction from said secondary winding to said output port during said second interval of said cyclic period.

5. The power converter according to claim 1, wherein said synchronous rectification circuit comprises:

a first synchronous rectification device with a control gate responsive to a voltage of said secondary winding and biased periodically conducting and connected for conducting current from said secondary winding to said output port; and a second synchronous rectification device connected for conducting from said secondary winding to said output port when said first synchronous rectification device is non-conducting.

6. The power converter according to claim 5, wherein said first synchronous rectification device is a MOSFET.

7. The power converter according to claim 5, wherein said second synchronous rectification device is a MOSFET.

8. A power converter, comprising:

an input port for accepting a DC voltage;

an output port for accepting a load to be energized;

a combined transformer-inductor device including:

a magnetic core including an upper member, a lower member, and a plurality of legs extending between the upper and lower member such that at least one of the plurality of legs contacts both the upper member and the lower member, a primary winding and a secondary winding wound around a first leg of the plurality of legs such that a high reluctance flux path is formed in the first leg, the upper member, a second leg of the plurality of legs and the lower member, and an auxiliary winding wound around a third leg of the plurality of legs and connected in series between the secondary winding and the output port such that a low reluctance flux path is formed in the second leg, the upper member, the third leg and the lower member, wherein said primary and said secondary windings perform a transformer function and said auxiliary winding performs an output filter function;

a clamp switching circuit connected to said input port for periodically providing a full square waveform signal with a positive voltage to said primary winding during a first interval of a cyclic period of said power converter and said full square waveform signal with a negative voltage to reset said primary winding during a second interval other than said first interval, whereby AC flux is cancelled in said second leg to reduce a magnetic loss of said combined transformer-inductor device, wherein said clamp switching circuit further comprises a clamp device for limiting a voltage across said transformer during said second interval of said cyclic period; and a synchronous rectification circuit connected to the combined transformer-inductor device for enabling conduction from said secondary winding to said output port during said first interval and said second interval of said cyclic period, wherein said auxiliary winding is coupled between said output port and said synchronous rectification circuit for providing an inductance to filter an output signal.

* * * * *